United States Patent Office 3,318,855
Patented May 9, 1967

3,318,855
PHOSPHORUS CONTAINING COPOLYMERS
Lester Friedman, Beachwood Village, Ohio, assignor, by mesne assignments, to Union Carbide Corporation, a corporation of New York
No Drawing. Filed June 22, 1962, Ser. No. 204,606
20 Claims. (Cl. 260—88.1)

This invention relates to the preparation of phosphorus containing polymers.

It is known to prepare copolymers of monoolefins such as ethylene, propylene and isobutylene with vinyl esters such as vinyl acetate, vinyl tertiary butyl acetate, vinyl trimethyl acetate, vinyl stearate, vinyl cylohexanoate, vinyl benzoate, vinyl formate, vinyl propionate and vinyl butyrate. It is also known to hydrolyze such copolymers to form copolymers of the monoolefin and vinyl alcohol. If the copolymer is not completely hydrolyzed, then the product will be a terpolymer of the monoolefin, vinyl ester and vinyl alcohol.

Illustrative examples of such monoolefin-vinyl ester copolymers and hydrolyzed copolymers are those in Roedel Patent 2,703,794, Hanford Patent 2,473,996, Plambeck Patent 2,467,774, Roland Patent 2,399,653, Loder Patent 2,451,963 and Squires Patent 2,395,381.

As shown in such patents, the molar ratio of monoolefin to vinyl ester or vinyl alcohol in the copolymer can vary from 1:99 to 99:1.

Ethylene-vinyl acetate copolymers are available commercially under the trademark Elvax. Elvax resin 150 is a copolymer of ethylene-vinyl acetate in a 67:33 weight ratio (a molar ratio of approximately 6:1). Elvax resin 240 is a copolymer of ethylene-vinyl acetate in a 72:28 weight ratio (a molar ratio of approximately 8:1).

It is an object of the present invention to prepare novel phosphites.

An additional object is to prepare novel phosphonates.

Another object is to improve the flame resistance of polyurethane and other formulations.

A further object is to develop improved stabilizers against oxidation and thermal degradation.

Still further objects and the entire scope of applicability of the present invention will become apparent from the detailed description given hereinafter; it should be understood, however, that the detailed description and specific examples, while indicating preferred embodiments of the the invention, are given by way of illustration only, since various changes and modifications within the spirit and scope of the invention will become apparent to those skilled in the art from this detailed description.

It has now been found that these objects can be attained by preparing phosphites and phosphonates of copolymers of monoolefins having 2 to 4 carbon atoms and vinyl alcohol and terpolymers of such monoolefins, vinyl alcohol and vinyl esters of hydrocarbon monocarboxylic acids. In the terpolymers the molar amount of vinyl ester units is preferably less than the molar amount of vinyl alcohol units, although there can be used any of the terpolymers in Roland Patent 2,399,653. The terpolymer can be one in which 10 to 80% or even 99% of the original vinyl ester groups are hydrolyzed to vinyl alcohol groups.

The molar ratio of monoolefin to vinyl alcohol in the copolymers (and terpolymers) can be from 1:99 to 99:1 although it is presently preferred to have a molar excess of monoolefin units, e.g., from 1 to 15 units of monoolefin per unit of vinyl alcohol.

To make the phosphites of the present invention there can be employed any of the monoolefin-hydrolyzed vinyl ester polymers disclosed in the aforementioned Roland, Plambeck and Loder patents or any of the polymers which are formed by hydrolyzing the monoolefin-vinyl ester polymers of the previously mentioned Roedel, Hanford and Squires patents. There can also be used any of the commercially available monoolefin-hydrolyzed vinyl ester polymers such as Elvax 150 and Elvax 240.

Thus, there can be used ethylene-vinyl alcohol copolymer (molar ratios of 1:1, 6:1, 9:1, 20:1, 1:4, 1:10 and 1:20), propylene-vinyl alcohol copolymer (molar ratios of 1:1, 10:1, 1:10), isobutylene-vinyl alcohol copolymer (molar ratios of 1:1, 15:1, 1:15) and terpolymers such as ethylene-vinyl alcohol-vinyl acetate (molar ratios of 6:1:0.1, 9:1:0.2, 15:1:0.5, 1:1:0.3, 1:10:1), ethylene-vinyl alcohol-vinyl propionate (molar ratios of 10:1:0.1, 3:1:0.05), propylene-vinyl alcohol-vinyl acetate (molar ratios of 6:1:0.1, 10:1:0.2), ethylene-vinyl alcohol-vinyl benzoate (molar ratio of 1:2.2:0.3), isobutylene-vinyl alcohol-vinyl stearate (molar ratio of 1:1:0.2), ethylene-vinyl alcohol-vinyl formate (molar ratio of 8:1:0.1).

The hydrolysis of monoolefin-vinyl ester copolymers can be carried out in conventional fashion utilizing either acid or alkaline catalysts. Thus, copolymers of ethylene with vinyl acetate, vinyl formate, vinyl propionate, vinyl stearate, vinyl benzoate, vinyl cyclohexanoate and vinyl butyrate can be partially or completely hydrolyzed by the use of an alcohol such as methanol, amyl alcohol, ethyl alcohol, hexyl alcohol, isopropyl alcohol or n-propyl alcohol in the presence of a strong acid catalyst, e.g., a sulfonated cation exchange resin, sulfuric acid or an alkaline catalyst such as sodium hydroxide, sodium alkoxide, e.g., sodium methylate, sodium amylate, lithium alkoxide, e.g., lithium propylate, potassium alkoxide, e.g., potassium butyrate, potassium hydroxide, anion exchange resins. Typical examples of alkaline hydrolysis or alcoholysis are shown in the Roland and Plambeck patents set forth supra.

The monoolefin-hydrolyzed vinyl ester polymers employed as starting materials in the present invention are macromolecular interpolymers having the following empirical formula:

$$(C_nH_{2n})_x(C_2H_3OH)_y(C_2H_3OOCR)_z$$

where $n$ is an integer between 2 and 4, $x$ and $y$ are positive numbers, the ratio of $x$ and $y$ is within the range of from 1:99 and 99:1, $z$ is zero or a positive number and the ratio of $y$ to $z$ is between ∞ and 1:10 and R is an alkyl (including cycloalkyl) group or an aryl group.

The compounds of the present invention are prepared by introducing phosphorus into the molecule.

Thus, in one aspect of the invention, the monoolefin-hydrolyzed vinyl ester is reacted with a 2-aryloxy 1,3,2-dioxaphosphorinane of the type shown in Hechenbleikner Patent 2,834,798 or a 2-alkoxy 1,3,2-dioxaphosphorinane while removing with the aid of distillation the phenol or alkanol formed as the case might be (preferably while heating at reduced pressure, e.g., 5–20 mm.) and forming a monoolefin-vinyl alcohol copolymer ester of the dioxaphosphorinane, said ester being a macromolecular polymer having the following empirical formula:

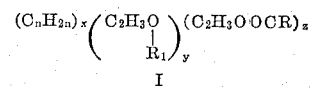

I where $n$, $x$, $y$, $z$ and R are as defined above and $R_1$ is selected from the group consisting of H and

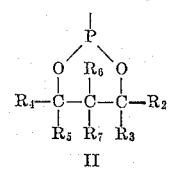

II wherein $R_2$, $R_3$, $R_4$, $R_5$, $R_6$ and $R_7$ are the same or different and are hydrogen or lower alkyl. At least one $R_1$ must have the Formula II. Desirably, at least 50% and preferably all $R_1$ groups have the Formula II.

Compounds having the Formula I are useful as stabilizers for hydrocarbon polymers, e.g., polyethylene and polypropylene, and also are useful as heat and oxidation stabilizers for halogen containing resins such as vinyl halide resins, e.g., polyvinyl chloride and vinyl chloride-vinyl acetate copolymers. As stabilizers they are used in an amount of 0.05–10% by weight of the material being stabilized. Compounds of Formula I and the isomer phosphonates are also useful as fire retardant agents for cellulose.

To prepare the compounds of Formula I there is reacted a copolymer such as ethylene-vinyl alcohol copolymer, propylene-vinyl alcohol copolymer, or isobutylene-vinyl alcohol copolymer or ethyl-vinyl alcohol-vinyl acetate terpolymer or the like with the appropriate dioxaphosphorinane. The molar ratio of monoolefin to vinyl alcohol (and vinyl ester) can be any of those set forth previously. If less than one mol of phosphorinane is used per OH unit on the polymer, the resulting product will have free hydroxyl groups. The phosphonates are prepared by Arbuzov rearrangement of the phosphites of Formula I, e.g., by using 0.5–10% of an alkyl halide such as amyl bromide.

Examples of dioxaphosphorinanes which can be used are phenyl neopentylene phosphite (2-phenoxy-5,5-dimethyl-1,3,2-dioxaphosphorinane),
decyl neopentylene phosphite,
stearyl neopentylene phosphite,
ethyl neopentylene phosphite,
methyl neopentylene phosphite,
cresyl neopentylene phosphite,
2-phenoxy-1,2,3-dioxaphosphorinane,
2-phenoxy-4-methyl-1,3,2-dioxaphosphorinane (phenyl 1,3-butylene phosphite),
2-phenoxy-4,4,6-trimethyl-1,3,2-dioxaphosphorinane,
2-phenoxy-4-propyl-5-ethyl-1,3,2-dioxaphosphorinane,
2-phenoxy-4,6-dimethyl-1,3,2-dioxaphosphorinane (phenyl 2,4-pentylene phosphite),
2-phenoxy-4-ethyl-5-methyl-1,3,2-dioxaphosphorinane,
2-phenoxy-4-propyl-6-methyl-1,3,2-dioxaphosphorinane (phenyl 2,4-heptylene phosphite),
2-phenoxy-5-ethyl-5-butyl-1,3,2-dioxaphosphorinane,
2-phenoxy-4-propyl-1,3,2-dioxaphosphorinane (phenyl 1,3-hexylene phosphite).

The reaction is carried out in the presence of 0.05–10%, preferably 0.1–1%, by weight of the dioxaphosphorinane of a catalyst. The preferred catalysts are dihydrocarbon (such as aryl and alkyl) phosphites or dihaloaryl phosphites. Examples of such catalyst include diphenyl phosphite, di p-cresyl phosphite, di o-cresyl phosphite, di 2,4-xylenyl phosphite, didecyl phosphite, dimethyl phosphite, dioctadecyl phosphite and di p-chlorophenyl phosphite. Alternatively, alkaline catalysts can be used such as sodium hydroxide, sodium ethylate, sodium decylate, sodium phenolate and potassium cresylate.

Specific examples of polymers within Formula I and the isomeric phosphonates are the completely transesterified products of completely hydrolyzed Elvax 150 with (a) phenyl neopentylene phosphite (and the phosphonate isomeric with this product), or (b) phenyl trimethylene phosphite, or (c) phenyl 1,3-butylene phosphite (and the phosphonate isomeric with this product), or (d) 2-phenoxy-4,4,6-trimethyl-1,3,2-dioxaphosphorinane (and the phosphonate isomeric with this product), or (e) 2-phenoxy - 4 - propyl-5-ethyl-1,3,2-dioxaphosphorinane, or (f) phenyl 2,4-pentylene phosphite (and the phosphonate isomeric with this product), or (g) 2-phenoxy-4-ethyl-5-methyl-1,3,2-dioxaphosphorinane, or (h) phenyl 2,4-heptylene phosphite (and the phosphonate isomeric with this product), or (i) phenyl neoheptylene phosphite (and the phosphonate isomeric with this product), or (j) 2-phenoxy-5-ethyl-5-butyl-1,3,2-dioxaphosphorinane, or (k) phenyl 1,3-hexylene phosphite; the transesterified product of completely hydrolyzed Elvax 150 wherein 50% of the hydroxyl groups are transesterified with phenyl neopentylene phosphite (and the phosphonate isomeric with this product); the transesterified product of 60% hydrolyzed Elvax 150 (i.e., an ethylene-vinyl acetate-vinyl alcohol terpolymer) wherein all of the hydroxyl groups are transesterified with phenyl neopentylene phosphite (and the phosphonate isomeric with this product); the completely transesterified products of completely hydrolyzed Elvax 240 with (a) phenyl neopentylene phosphite (and the phosphonate isomeric with this product), (b) phenyl trimethylene phosphite, and (c) phenyl 1,3-butylene phosphite; the completely transesterified product of completely hydrolyzed ethylene-vinyl acetate copolymer (mol ratio 20:1) with phenyl neopentylene phosphite (and the phosphonate isomeric with this product); the completely transesterified product of completely hydrolyzed ethylene-vinyl acetate copolymer (mol ratio 1:20) with phenyl neopentylene phosphite (and the phosphonate isomeric with this product); the completely transesterified product of completely hydrolyzed propylene-vinyl acetate copolymer (mol ratio 10:1) with phenyl neopentylene phosphite (and the phosphonate isomeric with this product); the completely transesterified product of completely hydrolyzed propylene-vinyl propionate copolymer (mol ratio 1:10) with phenyl neoheptylene phosphite (and the phosphonate isomeric with this product); the completely transesterified product of completely hydrolyzed isobutylene vinyl acetate copolymer (mol ratio 8:1) with phenyl neoheptylene phosphite (and the phosphonate isomeric with this product).

In a second aspect of the present invention the monoolefin-hydrolyzed vinyl ester is reacted with a trihydrocarbon phosphite, e.g., a triaryl phosphite or a trialkyl phosphite, to form a dihydrocarbon phosphite ester (or with a trihaloaryl phosphite to form a dihaloaryl phosphite ester) of the monoolefin-hydrolyzed vinyl ester copolymer. Preferably, at least one mol of the trihydrocarbon phosphite is employed per mol of OH on the copolymer. If less trihydrocarbon phosphite is used, e.g., 0.33 mol per mol of OH on the copolymer, the product has free hydroxyl groups and some cross-linking occurs.

The phosphites prepared in this second aspect of the invention are useful as such as stabilizers for polyolefins, e.g., polyethylene and polypropylene or vinyl halide resins. They are also useful as intermediates in preparing hydroxyl containing phosphites or in preparing phosphonates. The phosphonates are prepared from the phosphites by an Arbuzov rearrangement, e.g., by heating with 0.5–10% of an alkyl halide such as amyl bromide or amyl chloride.

The phosphites of this second form of the invention have the formula:

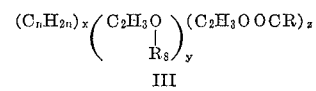

III where $n$, $x$, $y$, $z$ and R are as defined above and $R_8$ is hydrogen or

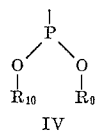

IV where $R_9$ and $R_{10}$ are hydrocarbon, e.g., alkyl or aryl, or haloaryl. At least one $R_8$ has the Formula IV. Desirably, at least 50%, and preferably all, $R_8$ groups are Formula IV. The phosphonates are isomeric with these phosphites.

To prepare the compounds of Formula III, any of the monoolefin-hydrolyzed vinyl esters disclosed above are reacted with a trihydrocarbon phosphite such as triphenyl phosphite, tri p-cresyl phosphite, tri o-cresyl phosphite, tri m-cresyl phosphite, tri butylphenyl phosphite, tris decyl phosphite, decyl diphenyl phosphite, tri octadecyl phosphite, trimethyl phosphite, triethyl phosphite, tri p-chlorophenyl phosphite or tri o-chlorophenyl phosphite in the presence of 0.05–10%, preferably 0.1–1%, by weight of the phosphite of a dihydrocarbon phosphite or dihaloaryl phosphite, or with an alkaline catalyst of the type set forth above, and the phenol or alkanol formed removed by distillation, preferably under vacuum, e.g., 5–20 mm.

Examples of compounds within Formula III and the phosphonates isomeric therewith are the completely transesterified products (i.e., there is used at least one mol of trihydrocarbon phosphite for each mol of OH available) of completely hydrolyzed Elvax 150 with (a) triphenyl phosphite (and the phosphonate isomeric with this product), or (b) tri p-cresyl phosphite (and the phosphonate isomeric with this product), or (c) tris decyl phosphite (and the phosphonate isomeric with this product), or (d) tri p-chlorophenyl phosphite (and the phosphonate isomeric with this product), or (e) tri butylphenyl phosphite (and the phosphonate isomeric with this product), or (f) trimethyl phosphite (and the phosphonate isomeric with this product), or (g) tri octadecyl phosphite (and the phosphonate isomeric with this product); the transesterified product of completely hydrolyzed Elvax 150 wherein 70% of the hydroxyl groups are transesterified with triphenyl phosphite (and the phosphonate isomeric with this product); the transesterified product of 80% hydrolyzed Elvax 150 wherein all of the hydroxyl groups are transesterified with triphenyl phosphite (and the phosphonate isomeric with this product); the completely transesterified product of completely hydrolyzed Elvax 240 with (a) triphenyl phosphite (and the phosphonate isomeric with this product), or (b) tris decyl phosphite; the completely transesterified product of completely hydrolyzed ethylene-vinyl acetate copolymer (mol ratio 20:1) with triphenyl phosphite (and the phosphonate isomeric with this product); the completely transesterified product of completely hydrolyzed ethylene-vinyl acetate copolymer (mol ratio 1:20) with triphenyl phosphite (and the phosphonate isomeric with this product); the completely transesterified product of completely hydrolyzed propylene-vinyl acetate copolymer (mol ratio 10:1) with (a) triphenyl phosphite (and the phosphonate isomeric with this product) and (b) tris decyl phosphite (and the phosphonate isomeric with this product); the completely transesterified product of completely hydrolyzed propylene-vinyl acetate copolymer (mol ratio 1:10) with triphenyl phosphite (and the phosphonate isomeric with this product); the completely transesterified product of completely hydrolyzed isobutylene-vinyl acetate copolymer (mol ratio 8:1) with triphenyl phosphite (and the phosphonate isomeric with this product).

The compounds of Formula III and the isomeric phosphonates are particularly valuable for forming phosphites and phosphonates having hydroxyl groups available for further reaction. Thus, the compounds of Formula III and the isomeric phosphonates can be transesterified with certain polyhydric alcohols in the presence of a dihydrocarbon phosphite, a dihaloaryl phosphite or an alkaline catalyst and the phenol or alkanol removed by distillation. Preferably, at least one mol of the polyhydric alcohol is used per mol of aryloxy, alkoxy or haloaryloxy available. As the polyhydric alcohol there can be used dipropylene glycol, tripropylene glycol, polypropylene glycol molecular weight 425, polypropylene glycol molecular weight 2025, polypropylene glycol molecular weight 3000, diethylene glycol, triethylene glycol, polyethylene glycol molecular weight 2000, tris (2-hydroxypropoxy) propane, hexakis (2-hydroxypropoxy) hexane, tetrakis (2-hydroxypropoxymethyl) methane, alkaneether triols from 1,2,6-hexanetriol and propylene oxide having molecular weights of 750, 1500, 2400 and 4000 (available commercially as LHT 240, LHT 112, LHT 67 and LHT 42, respectively) triols from glycerine and propylene oxide having molecular weights of 1000 and 3000 (available commercially as LG 168 and LG 56, respectively), hexols from sorbitol and propylene oxide having molecular weights of 1000 and 2500, triols from glycerine and ethylene oxide molecular weight 1000, triol from glycerine and butylene oxide molecular weight 1500, triol from trimethylol propane and propylene oxide molecular weights 300, 400, 700, 1500, 2500 and 4000, ethylene oxide-propylene oxide adducts of molecular weights 500, 1000 and 2000, tetrols from pentaerythritol and propylene oxide molecular weights 400, 450, 500, 600, 750, 1000 and 2000, and octakis (2-hydroxypropyl) sucrose.

These hydroxyl containing phosphites have the formula:

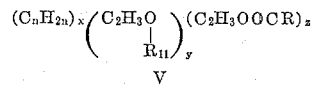

V where $n$, $x$, $y$ $z$ and R are as defined above and $R_{11}$ is the grouping

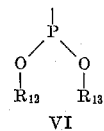

VI where at least one $R_{12}$ or $R_{13}$ in the molecule is the residue of an alkaneetherpolyol from which one hydroxyl group has been removed, said alkaneetherpolyol having 2 to 6 hydroxyl groups and being the ether of an alkanepolyol having 2 to 6 carbon atoms and 2 to 6 hydroxyl groups or sucrose with an alkylene glycol or polyalkylene glycol. The other $R_{12}$ and $R_{13}$ groups are the residue of the alkaneether polyol as defined above or are $R_9$ or $R_{10}$. Preferably, all $R_{12}$ and $R_{13}$ groups are the residues of an alkaneether polyol as defined above.

The phosphite compounds within Formula V and the isomeric phosphonates (which are prepared by Arbuzov rearrangement of the phosphites with 0.5–10% of an alkyl halide catalyst, e.g., amyl bromide) are useful for reaction with organic polyisocyanates, e.g., toluene diisocyanate, to form polyurethane elastomers and foams which are flame laminatable. The polyurethane foams also can be heat sealed directly to cellophane, Mylar (polyethylene terephthalate), paper, polyethylene and polypropylene. They also can be used to form fire-resistant polyesters by reaction with polybasic acids and anhydrides, or by transesterification, e.g., by reaction with phthalic anhydride, dimethyl terephthalate, maleic acid and adipic acid.

The compounds of formula V also can be prepared by reacting a hydrolyzed monoolefin-vinyl ester copolymer directly with a monoaryl bis (alkaneetherpolyol) phosphite or a monoalkyl bis (alkaneetherpolyol) phosphite in the presence of diphenyl phosphite or other catalyst as set forth above and removing the phenol or alkanol formed by distillation. Preferably, there is used at least one mol of the monoaryl bis (alkaneetherpolyol) phosphite for each mol of OH available from the copolymer. Typical examples of suitable reactants include phenyl bis (dipropylene glycol) phosphite, phenyl bis (diethylene glycol) phosphite, phenyl bis (tris hydroxypropoxy propane) phosphite, decyl bis (dipropylene glycol) phosphite, phenyl bis (polypropylene glycol molecular weight 2025) phosphite.

Examples of compounds within Formula V and the phosphonates isomeric therewith include the phosphite containing reaction products in which all of the phenyl groups present are replaced between (1) the completely transesterified product of completely hydrolyzed Elvax 150 with triphenyl phosphite and (2) (a) dipropylene glycol (and the phosphonate isomeric with this product), or (b) tripropylene glycol (and the phosphonate isomeric with this product), or (c) polypropylene glycol molecular weight 425 (and the phosphonate isomeric with this product), or (d) polypropylene glycol molecular weight 2025 (and the phosphonate isomeric with this product), or (e) diethylene glycol (and the phosphonate isomeric with this product), or (f) polyethylene glycol molecular weight 2000 (and the phosphonate isomeric with this product), or (g) tris (2-hydroxypropoxy) propane (and the phosphonate isomeric with this product), or (h) hexakis (2-hydroxypropoxy) hexane (and the phosphonate isomeric with this product), or (i) tris (2'-hydroxypropoxy)-1,2,6-hexanetriol (and the phosphonate isomeric with this product), or (j) tetrakis (2-hydroxypropoxymethyl) methane (and the phosphonate isomeric with this product), or (k) LHT 240 (and the phosphonate isomeric with this product) or (l) LG–56 (and the phosphonate isomeric with this product), or (m) glycerine-ethylene oxide adduct molecular weight 1000 (and the phosphonate isomeric with this product), or (n) glycerine-butylene oxide adduct molecular weight 1500 (and the phosphonate isomeric with this product), or (o) trimethylol propane-propylene oxide adduct molecular weight 700 (and the phosphonate isomeric with this product), or (p) pentaerythritol-propylene oxide adduct molecular weight 500 (and the phosphonate isomeric with this product), or (q) octakis (2-hydroxypropyl) sucrose (and the phosphonate isomeric with this product), or (r) octakis (2-hydroxypolypropoxy) sucrose wherein the polypropoxy group has a molecular weight of about 1000 (and the phosphonate isomeric with this product), or (s) propylene oxide-ethylene oxide adduct molecular weight 1500. (The same phosphite within Formula V as that set forth in reaction (2) (a) above can be prepared by reacting completely hydrolyzed Elvax 150 with sufficient phenyl bis dipropylene glycol phosphite to react with all the hydroxyl groups available.) Also included are the phosphite containing reaction product in which 80% of the phenyl groups present are replaced between (1) the completely transesterified product of completely hydrolyzed Elvax 150 with triphenyl phosphite and (2) dipropylene glycol (and the phosphonate isomeric with this product); the phosphite containing reaction product in which 90% of the decyl groups present are replaced between (1) the completely transesterified product of completely hydrolyzed Elvax 150 with tris decyl phosphite and (2) diethylene glycol (and the phosphonate isomeric with this product); the phosphite containing reaction product in which all the phenyl groups present are replaced between (1) completely hydrolyzed Elvax 150 wherein 70% of the hydroxyl groups are transesterified with triphenyl phosphite and (2) dipropylene glycol (and the phosphonate isomeric with this product); the phosphite containing reaction products in which all the phenyl groups present are replaced between (1) the transesterified product of 80% hydrolyzed Elvax 150 wherein all of the hydroxyl groups are transesterified with triphenyl phosphite and (2) (a) dipropylene glycol (and the phosphonate isomeric with this product), or (b) diethylene glycol (and the phosphonate isomeric with this product); the phosphite containing reaction products in which all of the phenyl groups present are replaced between (1) the completely transesterified product of completely hydrolyzed Elvax 240 with triphenyl phosphite and (2) (a) dipropylene glycol (and the phosphonate isomeric with this product), or (b) tris (2-hydroxypropoxy) propane (and the phosphonate isomeric with this product), or (c) triethylene glycol (and the phosphonate isomeric with this product), or (d) octakis (2-hydroxypropyl) sucrose (and the phosphonate isomeric with this product); the phosphite containing reaction products in which all of the phenyl groups present are replaced between (1) the completely transesterified product of completely hydrolyzed ethylene-vinyl acetate copolymer (mol ratio 20:1) with triphenyl phosphite and (2) (a) dipropylene glycol (and the phosphonate isomeric with this product), or (b) diethylene glycol (and the phosphonate isomeric with this product), or (c) sorbitol-propylene oxide adduct molecular weight 1500 (and the phosphonate isomeric with this product); the phosphite containing reaction products in which all of the cresyl groups present are replaced between (1) the completely transesterified product of completely hydrolyzed ethylene-vinyl acetate copolymer (mol ratio 1:20) with tri p-cresyl phosphite and (2) (a) dipropylene glycol (and the phosphonate isomeric with this product), or (b) diethylene glycol (and the phosphonate isomeric with this product), or (c) tris (2-hydroxypropoxy) propane (and the phosphonate isomeric with this product); the phosphite containing reaction products in which all of the phenyl groups present are replaced between (1) the completely transesterified product of completely hydrolyzed propylene-vinyl acetate copolymer (mol ratio 7:1) with triphenyl phosphite and (2) (a) dipropylene glycol (and the phosphonate isomeric with this product, or (b) diethylene glycol (and the phosphonate isomeric with this product), or (c) LG–168 (and the phosphonate isomeric with this product), or (d) tris (2-hydroxypropoxy) propane (and the phosphonate isomeric with this product), or (e) octakis (2-hydroxypropoxy) sucrose (and the phosphonate isomeric with this product); the phosphite containing reaction product in which all the phenyl groups present are replaced between (1) the completely transesterified product of completely hydrolyzed isobutylene-vinyl acetate copolymer (mol ratio 1:8) with triphenyl phosphite and (2) dipropylene glycol (and the phosphonate isomeric with this product.)

A further aspect of the present invention is the preparation of phosphite compounds having the formula:

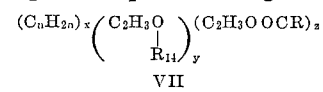

VII where $n$, $x$, $y$, $z$ and R are as previously defined and $R_{14}$ is

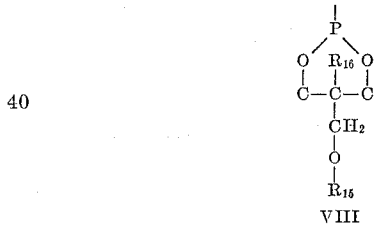

VIII where $R_{16}$ is alkyl, preferably methyl or ethyl or propyl and $R_{15}$ is allyl, methallyl, crotyl or chloroallyl. This form of the invention also includes the phosphonates isomeric with the phosphites of Formula VII.

The compounds of Formula VII are prepared by transesterifying the compounds of Formula III with a compound such as the monoallyl ether of 1,1,1-trimethylolethane, monoallyl ether of 1,1,1-trimethylolpropane, monoallyl ether of 1,1,1-trimethylolbutane, monomethallyl ether of 1,1,1-trimethylolpropane, monocrotyl ether of 1,1,1-trimethylolpropane, mono-2-chloroallyl ether of 1,1,1-trimethylolpropane. The monoethers employed are those where the allyl or substituted allyl group is etherified with one of the primary hydroxyl groups of the trimethylolalkane. The transesterification is preferably catalyzed with a dihydrocarbon phosphite, e.g., diphenyl phosphite, or a dihaloaryl phosphite in an amount of 0.1–10% or with an alkaline catalyst such as sodium phenolate or the other catalysts set forth supra. The phenol or alkanol formed in the transesterification is removed by distillation, preferably under a vacuum, e.g., 5–20 mm. The phosphonates isomeric with the phosphites of Formula VII can be prepared by Arbuzov rearrangement of the phosphites, e.g., utilizing 0.5–10% of an alkyl halide such as amyl bromide as a catalyst.

The products of Formula VII and the corresponding phosphonates can be homopolymerized to give hard, tough cross-linked high melting resins which are flame resistant. The homopolymers can be used as flameproofing agents for textiles and can also be prepared in the form of a cup. The products of Formula VII and the corresponding phosphonates can be epoxidized, e.g., with aqueous hydrogen peroxide solution or with peracetic acid dissolved in acetic acid, to give a polymeric epoxide which is useful as a cross-linking agent in making epoxy polymer systems, e.g., from bisphenol A and epichlorhydrin.

The products of Formula VII and the corresponding phosphonates also are valuable in preparing flame-resistant copolymers which can be coated on wood or metal or molded into various articles, e.g., cups. Thus, they can be copolymerized with other polymerizable materials containing a vinyl or vinylidene group, e.g., acrylonitrile, styrene, ethyl acrylate, methyl methacrylate, vinyl pyridine, vinylidene chloride, and vinyl chloride.

Examples of compounds within Formula VII and the corresponding phosphonates include the phosphorinane containing reaction products in which all of the phenyl groups present are replaced between (1) the completely transesterified product of completely hydrolyzed Elvax 150 with triphenyl phosphite and (2) (a) monoallyl ether of 1,1,1-trimethylolpropane (this product can also be called the allyloxy neohexylene phosphite ester of ethylene-vinyl alcohol copolymer mol ratio 6:1) [and the phosphonate isomeric with the product of (2) (a)], or (b) monoallyl ether of 1,1,1-trimethylolethane (and the phosphonate isomeric with this product), or (c) monoallyl ether of 1,1,1-trimethylolbutane (and the phosphonate isomeric with this product), or (d) monomethallyl ether of 1,1,1-trimethylolpropane (and the phosphonate isomeric with this product), or (e) 2-chloroallyl ether of 1,1,1-trimethylolpropane (and the phosphonate isomeric with this product), or (f) crotyl ether of 1,1,1-trimethylolpropane (and the phosphonate isomeric with this product); the phosphorinane containing reaction product in which 80% of the phenyl groups present are replaced between (1) the completely transesterified product of completely hydrolyzed Elvax 150 with triphenyl phosphite and (2) (a) monoallyl ether of 1,1,1-trimethylolpropane (and the phosphonate isomeric with this product), or (b) monoallyl ether of 1,1,1-trimethylolethane (and the phosphonate isomeric with this product); the phosphorinane containing reaction product in which 90% of the decyl groups present are replaced between (1) the completely transesterified product of completely hydrolyzed Elvax 150 with tris decyl phosphite and (2) monoallyl ether of 1,1,1-tri-methylolpropane (and the phosphonate isomeric with this product); the phosphorinane containing reaction products in which all the phenyl groups present are replaced between (1) completely hydrolyzed Elvax 150 wherein 70% of the hydroxyl groups are transesterified with triphenyl phosphite and (2) (a) monoallyl ether of 1,1,1-trimethylolpropane (and the phosphonate isomeric with this product), or (b) monoallyl ether of 1,1,1-trimethylolethane (and the phosphonate isomeric with this product); the phosphorinane containing reaction products in which all the phenyl groups present are replaced between (1) the transesterified product of 80% hydrolyzed Elvax 150 wherein all of the hydroxyl groups are transesterified with triphenyl phosphite and (2) (a) monoallyl ether of 1,1,1-trimethylolpropane (and the phosphonate isomeric with this product), or (b) monoallyl ether of 1,1,1-trimethylolethane (and the phosphonate isomeric with this product); the phosphorinane containing reaction products in which all of the phenyl groups present are replaced between (1) the completely transesterified product of completely hydrolyzed Elvax 240 with triphenyl phosphite and (2) (a) monoallyl ether of 1,1,1-trimethylolpropane (and the phosphonate isomeric with this product), or (b) monoallyl ether of 1,1,1-trimethylolethane (and the phosphonate isomeric with this product); the phosphorinane containing reaction product in which all of the phenyl groups present are replaced between (1) the completely transesterified product of completely hydrolyzed ethylene-vinyl acetate copolymer (mol ratio 20:1) with triphenyl phosphite and (2) monoallyl ether of 1,1,1-tri-methylolpropane (and the phosphonate isomeric with this product); the phosphorinane containing reaction product in which all of the phenyl groups present are replaced between (1) the completely transesterified product of completely hydrolyzed ethylene-vinyl acetate copolymer (mol ratio 1:20) with triphenyl phosphite and (2) monoallyl ether of 1,1,1-tri-methylolpropane (and the phosphonate isomeric with this product); the phosphorinane containing reaction products in which all of the phenyl groups present are replaced between (1) the completely transesterified product of completely hydrolyzed propylene-vinyl acetate copolymer (mol ratio 7:1) with triphenyl phosphite and (2) (a) monoallyl ether of 1,1,1-trimethylolpropane (and the phosphonate isomeric with this product), or (b) monoallyl ether of 1,1,1-trimethylolethane (and the phosphonate isomeric with this product); the phosphorinane containing reaction product in which all the phenyl groups present are replaced between (1) the completely transesterified product of completely hydrolyzed isobutylene-vinyl acetate copolymer (mol ratio 1:8) with triphenyl phosphite and (2) monoallyl ether of 1,1,1-trimethylolpropane (and the phosphonate isomeric with this product).

Unless otherwise indicated, all parts and percentages are by weight.

*Example 1*

150 grams of Elvax resin 150 was suspended in one liter of amyl alcohol. A few grams of a sulfonated styrene-divinyl benzene copolymer ion exchange resin (Dowex–50) were added and the mixture was brought to reflux. With the aid of a short fractionating column amyl acetate was removed overhead. Approximately 75 grams of amyl acetate were collected. The residual solution consisted of ethylene-vinyl alcohol copolymer in excess amyl alcohol. The ion exchange resin catalyst was removed by filtration and the excess amyl alcohol removed by distillation, first at atmospheric pressure and then by vacuum stripping. The residual copolymer 125 grams, was a waxy, almost clear, high melting solid.

In the following examples unless otherwise indicated, the ethylene-vinyl alcohol copolymer employed was a completely hydrolyzed Elvax 150, made in the manner described in Example 1.

*Example 2*

103 grams of ethylene-vinyl alcohol copolymer (approximately 0.5 mol OH) was transesterified with 113 grams of phenyl neopentylene phosphite (0.5 mol) in the presence of 2 grams of diphenyl phosphite as a catalyst at 120–135° C. The phenol formed was removed by distillation at 10–15 mm. About 46 grams of phenol were removed and the solid polymeric residue was essentially ethylene vinyl neopentylene phosphite copolymer (the completely transesterified products of completely hydrolyzed Elvax 150 with 2-phenoxy-5,5-dimethyl-1,3,2-dioxaphosphorinane). This polymer was compatible with hydrocarbon polymers and when used in an amount of 3 parts per 100 parts of polypropylene was an effective stabilizer against oxidation and thermal degradation.

*Example 3*

The procedure of Example 2 was repeated replacing the phenyl neopentylene phosphite with 0.5 mol of 2-phenoxy - 4,4,6 - trimethyl - 1,3,2 - dioxaphosphorinane. After removal of about 47 grams of phenol, there was recovered the completely transesterified product of ethylene-vinyl alcohol copolymer with 2-phenoxy-4,4,6-trimethyl-1,3,2-dioxaphosphorinane. (This product can also be called the ethylene-vinyl alcohol copolymer ester of 2-hydroxy-4,4,6-trimethyl-1,3,2-dioxaphosphorinane.)

*Example 4*

260 parts of ethylene vinyl neopentylene phosphite copolymer (the product of Example 2) was dispersed in 750 parts of o-dichlorobenzene as a solvent and 6 grams of n-butyl bromide added. The mixture was heated at 125–135° C. for 8 hours to form the phosphonate isomeric with the phosphite of Example 2. Then the solvent was removed by distillation in a vacuum and the polymeric phosphonate recovered as the residue.

*Example 5*

The procedure of Example 2 was repeated but only 56.5 grams of phenyl neopentylene phosphite were employed. About 23 grams of phenol were removed in the distillation step. The polymeric residue was ethylene-vinyl neopentylene phosphite copolymer in which 50% of the hydroxyl groups of the vinyl alcohol units were unesterified.

*Example 6*

The procedure of Example 2 was repeated but there was employed an Elvax 150 which had been hydrolyzed only to 60%. This ethylene-vinyl acetate-vinyl alcohol terpolymer in an amount containing 0.5 mol of free OH (8.5 grams of OH) was transesterified with 0.5 mol of phenyl neopentylene phosphite using 2 grams of diphenyl phosphite. After removal of the phenol formed by distillation, the residue was a vinyl acetate-ethylene vinyl neopentylene phosphite terpolymer.

*Example 7*

The procedure of Example 2 was repeated but the ethylene-vinyl alcohol copolymer was replaced by 134 grams of an ethylene-vinyl alcohol copolymer prepared by completely hydrolyzing Elvax 240. After removal of the phenol formed by distillation, there was obtained an ethylene vinyl neopentylene phosphite copolymer (ratio of ethylene to vinyl neopentylene phosphite units of about 8:1).

*Example 8*

The procedure of Example 2 was repeated but the ethylene-vinyl alcohol copolymer was replaced by 22.7 grams of a completely hydrolyzed ethylene-vinyl acetate copolymer (mol ratio 1:20). This was an amount sufficient to give 0.5 mol of OH. There was obtained as the residue after distilling off the phenol formed ethylene vinyl neopentylene phosphite copolymer.

*Example 9*

The procedure of Example 2 was repeated but the ethylene-vinyl alcohol copolymer was replaced by a propylene vinyl alcohol copolymer (completely hydrolyzed propylene-vinyl acetate copolymer) having a mol ratio of 1:2. There was used 32.5 grams of the copolymer (approximately 0.5 mol OH). After removal of about 47 grams of phenol by distillation, the residue was propylene-vinyl neopentylene phosphite copolymer.

*Example 10*

206 grams of ethylene-vinyl alcohol copolymer (approximately one mol of OH) was transesterified with 310 grams (one mol) of triphenyl phosphite utilizing 3 grams of diphenyl phosphite as the transesterification catalyst. The phenol formed was removed by distillation in a vacuum, 10–15 mm. Approximately 94 grams of phenol were collected. The viscous liquid residue was the essentially pure diphenyl phosphite ester of ethylene-vinyl alcohol copolymer (the completely transesterified product of conpletely hydrolyzed Elvax 150 with triphenyl phosphite).

*Example 11*

214 parts of the product of Exmaple 10 were isomerized to the corresponding phosphonate by heating with 3.5 grams of n-butyl bromide at 125–135° C. for 5 hours.

*Example 12*

The process of Example 10 was repeated but there was utilized only 103 grams (⅓ mol) of triphenyl phosphite. The resulting copolymer gelled during the distillation before the theoretical amount of phenol could be removed. The gelling resulted from cross-linking and network formation before transesterification was completed.

*Example 13*

The process of Example 10 was repeated replacing the triphenyl phosphite by one mol of tris decyl phosphite. After removal of 155 grams (about one mol) of decyl alcohol by distillation, the liquid residue was essentially pure didecyl phosphite ester of ethylene vinyl alcohol copolymer.

*Example 14*

The process of Example 10 was repeated replacing the ethylene-vinyl alcohol copolymer by the propylene-vinyl alcohol copolymer used in Example 9. There was employed 65 grams of the propylene-vinyl alcohol copolymer. The residue after removal of 94 grams of phenol by distillation was pure diphenyl ester of propylene-vinyl alcohol copolymer. This product was rearranged to the isomeric phosphonate by heating for 7 hours at 125–135° C. with 3.5 grams of n-butyl bromide.

*Example 15*

206 grams of ethylene-vinyl alcohol copolymer was transesterified with 310 grams of triphenyl phosphite in the manner described in Example 10 utilizing 2 grams diphenyl phosphite catalyst. After removal of one mol of phenol (94 grams), dipropylene glycol in an amount of 296 grams (2.2 mols) was added and the phenol removed overhead by distillation at 10–15 mm. Approximately 175–180 grams of pure phenol was recovered and a tail distillate consisting of phenol and excess dipropylene glycol was also recovered. The residual viscous liquid in the pot was the bis dipropylene glycol phosphite ester of the ethylene-vinyl alcohol copolymer. This product had a unit molecular weight of approximately 405 and a hydroxyl number of approximately 280.

*Example 16*

254 parts of the product of Example 15 was converted to the bis dipropylene glycol phosphonate ester of the ethylene-vinyl alcohol copolymer by heating with 4 grams of n-butyl bromide at 125–135° C. for 8 hours.

*Example 17*

206 grams of ethylene-vinyl alcohol copolymer was transesterified with one mol of phenyl bis dipropylene glycol phosphite in the presence of 3 grams of diphenyl phosphite catalyst. Approximately 94 grams of phenol were removed overhead by distillation at 10–15 mm. pressure to leave as a residue the bis dipropylene glycol phosphite ester of the ethylene-vinyl alcohol copolymer. This product was substantially identical with the product of Example 15.

The product of Example 15 (and also the product of Example 17) can be heated under vacuum to eliminate dipropylene glycol to give a more highly polymerized product.

*Example 18*

The procedure of Example 15 was repeated replacing the dipropylene glycol with 2.2 mols of diethylene glycol. The residue in the pot after removal of phenol and excess diethylene glycol was the bis diethylene glycol phosphite ester of the ethylene-vinyl alcohol copolymer. By addition of 7 grams of n-amyl bromide and heating to 125–135° C. for 8 hours this product was rearranged to the bis diethylene glycol phosphonate ester of ethylene-vinyl alcohol copolymer.

*Example 19*

The procedure of Example 15 was repeated replacing the dipropylene glycol with 2.0 mols of polypropylene glycol molecular weight 2025. After removal of the phenol formed, the residue in the pot was essentially bis polypropylene glycol 2025 phosphite ester of ethylene-vinyl alcohol copolymer.

*Example 20*

The procedure of Example 15 was repeated replacing the dipropylene glycol with 2.0 mols of tris (2-hydroxypropoxy) propane. After removal of the phenol by distillation, the viscous liquid residue in the pot was the bis [tris (2-hydroxypropoxy) propane] phosphite ester of the ethylene-vinyl alcohol copolymer. The isomeric phosphonate is formed by heating this product at 130° C. for 8 hours with 6 grams of n-butyl bromide.

*Example 21*

The procedure of Example 15 was repeated replacing the dipropylene glycol with 2.0 mols of octakis (2-hydroxypropoxy) sucrose. After removal of the phenol by distillation, the residue in the pot was the bis [octakis (2-hydroxypropoxy) sucrose] phosphite ester of the ethylene-vinyl alcohol copolymer.

By heating this product with 6 grams of n-butyl bromide at 135° C. for 7 hours, there was formed the bis [octakis (2-hydroxypropoxy) sucrose] phosphonate ester of the ethylene-vinyl alcohol copolymer.

*Example 22*

The procedure of Example 15 was repeated replacing the ethylene-vinyl alcohol copolymer with 65 grams of the propylene-vinyl alcohol copolymer used in Example 9. After removal of the phenol and excess dipropylene glycol by distillation, the residue in the pot was bis dipropylene glycol phosphite ester of the propylene-vinyl alcohol copolymer. This product was isomerized to the corresponding phosphonate by heating with 5 mol percent (based on the phosphite groups present) of n-butyl bromide for 7 hours at 130° C.

*Example 23*

206 grams of ethylene-vinyl alcohol copolymer was transesterified with 310 grams (one mol) of triphenyl phosphite in the presence of 3 grams of diphenyl phosphite catalyst to give the diphenyl phosphite ester of ethylene-vinyl alcohol copolymer after removal of 94 grams of phenol by distillation. The product (422 grams) was heated with 2 mols (288 grams) of the monoallyl ether of 1,1,1-trimethylolpropane at 10–15 mm. with removal of the phenol formed by distillation. The viscous residue in the pot was the allyloxy neohexylene phosphite ester of the ethylene-vinyl alcohol copolymer. By addition of 2% of benzoyl peroxide catalyst and heating, it was converted to a hard, tough, cross-linked, high melting resin.

*Example 24*

The procedure of Example 23 was repeated replacing the allyl ether of trimethylolpropane with 2 mols of the monoallyl ether of 1,1,1-trimethylolethane. After removal of the phenol, the residue in the pot was the allyloxy neopentylene phosphite ester of the ethylene-vinyl alcohol polymer.

*Example 25*

The allyloxy neohexylene phosphite ester of the ethylene-vinyl alcohol copolymer of Example 23 was converted to the isomeric phosphonate by heating for several hours at 125° C. with 5 mol percent of n-butyl bromide based on the mols of phosphorus.

I claim:

1. A phosphite containing macromolecular interpolymer having the formula

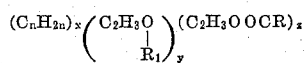

wherein $n$ is an integer between 2 and 4, $x$ and $y$ are positive numbers, $z$ is an integer of at least zero, the ratio of $x$ to $y$ is between 1:99 and 99:1 and the ratio between $y$ and $z$ is between a positive number: 0 and 1:10, R is selected from the group consisting of hydrogen, alkyl and aryl, $R_1$ is selected from the group consisting of (a) hydrogen, (b)

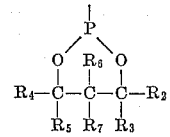

where $R_2$, $R_3$, $R_4$, $R_5$, $R_6$ and $R_7$ are selected from the group consisting of hydrogen and lower alkyl, (c)

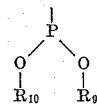

where $R_9$ and $R_{10}$ are selected from the group consisting of alkyl, aryl and haloaryl, (d)

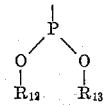

where $R_{12}$ is a member of the group consisting of a residue of an alkeneetherpolyol from which one hydroxyl group has been removed, said alkaneetherpolyol having 2 to 6 hydroxyl groups and being the ether of an alkanepolyol having 2 to 6 carbon atoms and 2 to 6 hydroxyl groups with a member of the group consisting of an alkylene glycol having 2 to 4 carbon atoms in the alkylene group and a polyalkylene glycol having 2 to 4 carbon atoms in the alkylene group, and an ether of sucrose with a member of the group consisting of an alkylene glycol having 2 to 4 carbon atoms in the alkylene group and a polyalkylene glycol having 2 to 4 carbon atoms in the alkylene group and $R_{13}$ is selected from the group consisting of $R_9$, $R_{10}$ and $R_{12}$ and (e)

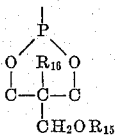

where $R_{16}$ is alkyl and $R_{15}$ is selected from the group consisting of allyl, methallyl, crotyl and 2-chloroallyl with the proviso that at least one $R_1$ is other than hydrogen.

2. An interpolymer according to claim 1 wherein at least 50% of the $R_1$ groups are other than hydrogen.

3. A macromolecular interpolymer phosphite having the formula

wherein the free valence on the oxygen is directly attached to the phosphorus atom of a 1,3,2-dioxaphosphorinane in which any substitutent on the phosphorinane ring is a lower alkyl group, where $n$ is an integer between 2 and 4, $x$ and $y$ are positive numbers, $z$ is an integer of at least zero, $v$ is an integer of at least zero, the ratio of $x$ to $y$ is between 1:99 and 99:1, the ratio between $y$ and $z$ is between a positive number:0 and 1:10 and 1:1, R is alkyl.

4. A phosphite according to claim 3 wherein $z$ is zero and $n$ is 2.

5. A phosphite according to claim 4 wherein the ratio between $x$ and $y$ is between 6:1 and 8:1.

6. Ethylene-vinyl neopentylene phosphite macromolecular copolymer wherein the ratio of ethylene to vinyl neopentylene phosphite groups is between 6:1 and 8:1.

7. A macromolecular interpolymer phosphite having the formula

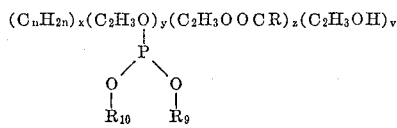

where $n$ is an integer between 2 and 4, $x$ and $y$ are positive numbers, $z$ is an integer of at least zero, $v$ is an integer of at least zero, the ratio of $x$ to $y$ is between 1:99 and 99:1, the ratio between $y$ and $z$ is between a positive number:0 and 1:10 and the ratio between $y$ and $v$ is between a positive number:0 and 1:1, R is alkyl and $R_9$ and $R_{10}$ are alkyl.

8. A phosphite according to claim 7 wherein $z$ is 0, $n$ is 2, and the ratio between $x$ and $y$ is between 6:1 and 8:1.

9. Ethylene-vinyl bis aryl phosphite macromolecular copolymer wherein the aryl groups are of the benzene series and have up to 7 carbon atoms wherein the ratio of ethylene to vinyl bis phenyl groups is between 1:99 and 99:1.

10. A macromolecular interpolymer phosphite having the formula

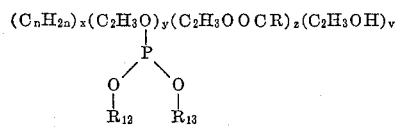

where $n$ is an integer between 2 and 4, $x$ and $y$ are positive numbers, $z$ is an integer of at least zero, $v$ is an integer of at least zero, the ratio of $x$ to $y$ is between 1:99 and 99:1, the ratio between $y$ and $z$ is between a positive number : 0 and 1:10 and the ratio between $y$ and $v$ is between a positive number:0 and 1:1, R is alkyl and $R_{12}$ and $R_{13}$ are a residue of an alkaneetherpolyol from which one hydroxyl group has been removed, said alkaneetherpolyol having 2 to 6 hydroxyl groups and being the ether of an alkanepolyol having 2 to 6 carbon atoms and 2 to 6 hydroxyl groups with a member of the group consisting of an alkylene glycol having 2 to 4 carbon atoms in the alkylene group and a polyalkylene glycol having 2 to 4 carbon atoms in the alkylene group.

11. A phosphite according to claim 10 wherein $z$ is zero, $n$ is 2 and the ratio between $x$ and $y$ is between 6: and 8:1 and $R_9$ and $R_{10}$ are alkyl.

12. The macromolecular bis dipropylene glycol phosphite ester of ethylene vinyl alcohol copolymer where the ratio of ethylene to vinyl alcohol groups is between 6:1 and 8:1.

13. A macromolecular interpolymer phosphite having the formula

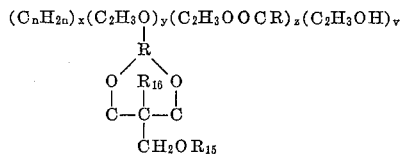

where $n$ is an integer between 2 and 4, $x$ and $y$ are positive numbers, $z$ is an integer of at least zero, $v$ is an integer of at least zero, the ratio of $x$ to $y$ is between 1:99 and 99:1, the ratio between $y$ and $z$ is between a positive number:0 and 1:10 and the ratio between $y$ and $v$ is between a positive number:0 and 1:1, R is alkyl, $R_{16}$ is lower alkyl and $R_{15}$ is alkenyl having 3 to 4 carbon atoms.

14. A phosphonate isomeric with the phosphite of claim 13.

15. A phosphite according to claim 13 wherein $z$ is zero wherein $n$ is 2.

16. The macromolecular allyloxy neohexylene phosphite ester of ethylene-vinyl alcohol copolymer wherein the ratio of ethylene units to vinyl alcohol units in the copolymer is between 1:99 and 99:1.

17. The macromolecular allyloxy neopentylene phosphite ester of ethylene-vinyl alcohol copolymer wherein the ratio of ethylene units to vinyl alcohol units in the copolymer is between 1:99 and 99:1.

18. A macromolecular interpolymer phosphite having the formula

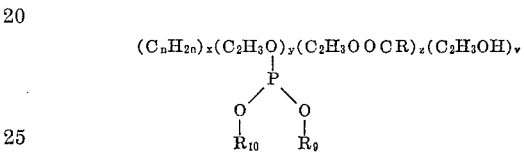

where $n$ is an integer between 2 and 4, $x$ and $y$ are positive numbers, $z$ is an integer of at least zero, $v$ is an integer of at least zero, the ratio of $x$ to $y$ is between 1:99 and 99:1, the ratio between $y$ and $z$ is between a positive number:0 and 1:10 and the ratio between $y$ and $v$ is between a positive number:0 and 1:1, R is alkyl and $R_9$ and $R_{10}$ are aryl.

19. A macromolecular interpolymer phosphite having the formula

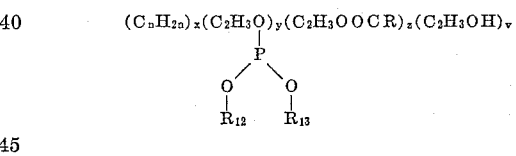

where $n$ is an integer between 2 and 4, $x$ and $y$ are positive numbers, $z$ is an integer of at least zero, $v$ is an integer of at least zero, the ratio of $x$ to $y$ is between 1:99 and 99:1, the ratio between $y$ and $z$ is between a positive number:0 and 1:10 and the ratio between $y$ and $v$ is between a positive number:0 and 1:1, R is alkyl, and $R_{12}$ and $R_{13}$ are an ether of sucrose with a member of the group consisting of an alkylene glycol having 2 to 4 carbon atoms in the alkylene group and a polyalkylene glycol having 2 to 4 carbon atoms in the alkylene group.

20. A macromolecular interpolymer phosphite having the formula

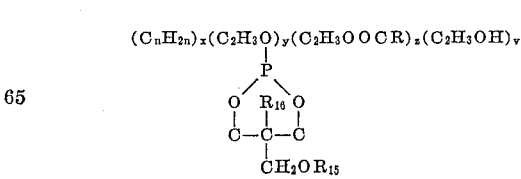

where $n$ is an integer between 2 and 4, $x$ and $y$ are positive numbers, $z$ is an integer of at least zero, $v$ is an integer of at least zero, the ratio of $x$ to $y$ is between 1:99 and 99:1, the ratio between $y$ and $z$ is between a positive number:0 and 1:10 and the ratio between $y$ and $v$ is between a positive number: 0 and 1:1, R is alkyl, $R_{16}$ is lower alkyl and $R_{15}$ is 2-chloroallyl.

References Cited by the Examiner

UNITED STATES PATENTS

| | | | |
|---|---|---|---|
| 2,395,381 | 2/1946 | Squires | 260—87.3 |
| 2,467,774 | 4/1949 | Plambeck | 260—87.3 |
| 2,671,106 | 3/1954 | Albisetti et al. | 260—80 |
| 2,703,794 | 3/1955 | Roedel | 260—87.3 |
| 2,834,798 | 5/1958 | Hechenbleikner et al. | 260—45.8 |
| 2,945,014 | 7/1960 | Hartley et al. | 260—87.3 |

FOREIGN PATENTS 1,125,658   3/1962   Germany.

OTHER REFERENCES

Marvel et al.: J. Pol. Sci., 8 No. 2 (1952), pp. 255.6, 260–80.

Kosolapoff: "Organophosphorous Compounds," Wiley (1950), pp. 191, 192, 203–206.

JOSEPH L. SCHOFER, *Primary Examiner.*

WILLIAM H. SHORT, *Examiner.*

H. WONG, W. G. GOODSON, *Assistant Examiners.*